D. McKELLAR.
Walking Planter.
No. 107,796.  Patented Sept. 27, 1870.
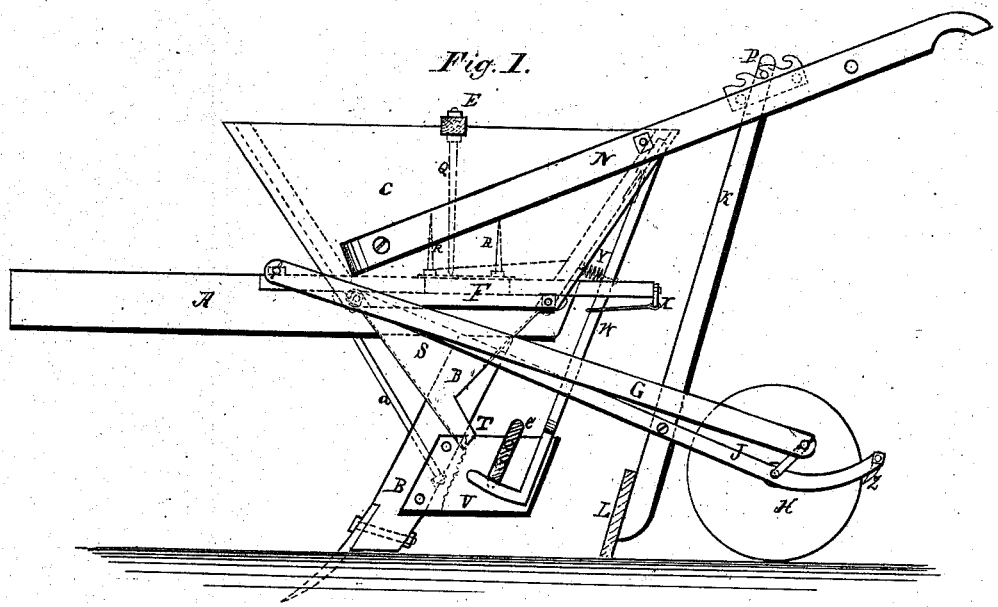
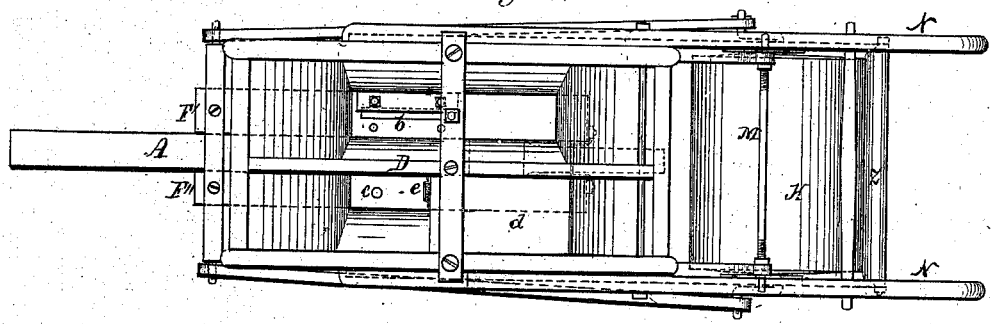
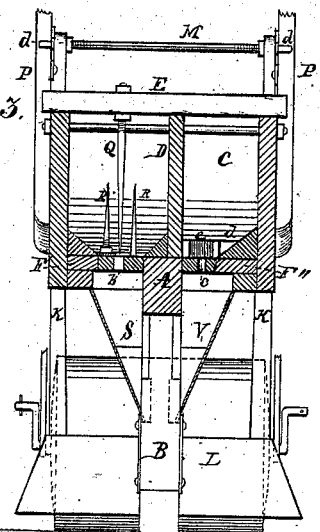

United States Patent Office.

DUNCAN McKELLAR, OF SELMA, ALABAMA.

Letters Patent No. 107,796, dated September 27, 1870.

IMPROVEMENT IN PLANTERS AND DISTRIBUTERS.

The Schedule referred to in these Letters Patent and making part of the same

*To all whom it may concern:*

Be it known that I, DUNCAN McKELLAR, of Selma, in the county of Dallas and State of Alabama, have invented new and useful Improvements in Planters and Distributers; and I do hereby declare the following to be a clear and exact description thereof, sufficient to enable others skilled in the art to which my invention appertains to make and use the same, reference being had to the accompanying drawing forming part of this specification, in which—

Figure 1 is a side elevation of the device illustrating my invention.

Figure 2 is a top or plan view thereof.

Figure 3 is a transverse section.

Similar letters of reference indicate corresponding parts in the several figures.

My invention consists in a device for planting cotton, corn, &c., at any given distances apart, and depositing manure on the hills in quantities, as may be desired, and subsequently covering and rolling the seed by one operation.

In the drawing—

A represents the main beam, to which is connected the standard B, both of which may be of ordinary form and construction, and braced together by rods or other connection a.

From the beam A rises the hopper C, which has a vertical partition-board, D, arranged longitudinally therein, and a transverse bar, E, at or about its top.

At the bottom of the hopper is placed a slide, F, which, in the present case, consists of two bars, F' F'', one at each side of the main beam A, and sufficiently long to project beyond the front and rear ends of the hopper.

In the bar F' is formed a longitudinal slot, b, and in the other bar, F'', is a perforation or opening, c.

In the division of the hopper above the bar F'' is placed a plate, d, having at its forward end a brush, e, which comes in contact with said bar F'', and prevents clogging of seed at the top of the opening e, and, by means of the opening e, only the requisite number of grains can be discharged at a time.

To one end of the slide F, I pivot rods or pitmen G, which extend toward the rear, and are secured to the axis of a roller, H, by a crank-shaft, wrist-pin, or otherwise.

This roller has its axis mounted on arms J, whose forward ends are hinged to the hopper C or the main beam A, whereby the roller may be readily elevated and lowered.

It will be seen that the rotation of the roller will operate the rods J, and communicate a reciprocating motion to the slide F.

To the hinged arms J, I pivot arms K K, to whose lower ends is secured a bar or plate, L, which is designed to act as a coverer, although a harrow may be secured to the arms K K for the same purpose.

A rod or bar, M, unites the upper ends of said arms K K, and its ends project sufficiently to form gudgeons d. In lieu of these gudgeons, pins may be secured to the arms and accomplish the same result, as will be presently explained.

N represents handles, which are of ordinary form and construction. They are secured to the hopper or main beam, and project to the rear in the usual manner.

I secure a notched plate, P, to each side of the handles, and adapt them for engaging with the gudgeons or pins d, so that the coverer L may be held at different elevations in order to regulate the depth of penetration of the plow on standard B, as well as to cover the soil relatively to such depth.

From the top bar E of the hopper C there is suspended a knife-blade, Q, which occupies a position between knives R R, secured to the bar F' of the slide F.

When manure is introduced into the hopper and the slide reciprocated, the knives cut it into small pieces, which drop through the opening b in the slide-bar F', into a conveyer or chute, S.

This conveyer is located below the hopper, and opens into a discharge-box or chamber, T, which consists of two side pieces, and is open at top and bottom, but closed at rear by a movable board, e', whereby the dimensions of said chamber may be enlarged or diminished.

A similar conveyer or chute, U, communicates with the corn or seed-compartment, or hopper, and discharges into the chamber T in a manner similar to the course of the manure, so that the corn or seed and the manure will be simultaneously discharged and planted.

The bottom of the chamber T is alternately closed and opened by a gate, V, which reciprocates at or about the bottom of the hopper, below the board e', and is secured to a bar or rod, W, hinged to the hopper, main beam, or elsewhere.

The outward or opening motion is imparted to the gate by the slide F, through the medium of a band, or strap-link, or other connection, as at X, and the return or closing motion preferably by a spring, Y, suitably located.

A scraper, Z, is hung to the rear of the arms J, over the roller H, so that the latter is cleared of any earth or matter which may adhere to it.

It will be seen that corn, cotton, and other seed may be dropped at any given distance in the furrows opened by the plow, and manure distributed on each hill in any desired quantity by one operation, and both subsequently covered and rolled. The various parts are easily rendered adjustable by means of bolts, screws, slots, &c., as is well known for such purposes. For planting cotton I employ two slide-bars, each with longitudinal openings similar to the opening $b$.

The slide F and gate V are rendered inoperative by elevating the roller, and holding it thus by means of the pins or gudgeons and the notched plates. Instead of these plates the notches may be made directly on the handles; but this may weaken the latter, and is therefore not desirable.

It is evident that the device is alike simple and practical.

Having thus described my invention,

What I claim as new, and desire to secure by Letters Patent, is—

1. The reciprocating slide F, gate V, coverer L, and roller H, combined, arranged, and operating substantially as described.

2. The suspended gate V, forming the bottom of the discharge-chamber T, when arranged and operating in connection with the slide F and spring Y, substantially as and for the purpose set forth.

3. The arms K, carrying the coverer L, and jointed to the bars J, which carry the roller H, in combination with the notches P on the handles, when constructed and operated substantially as described.

4. The cutters Q and R, in connection with the hopper and the slide, substantially as and for the purpose described.

5. The adjustable back board $e$ of the discharge-chamber T, substantially as and for the purpose described.

To the above I have signed my name this 15th day of July, 1870.

DUNCAN McKELLAR.

Witnesses:
 JAMES H. ROBINSON,
 C. YOUNG.